March 17, 1942.  M. H. PRESS  2,276,871
FILM FEEDING MECHANISM
Filed Aug. 15, 1939  3 Sheets-Sheet 1
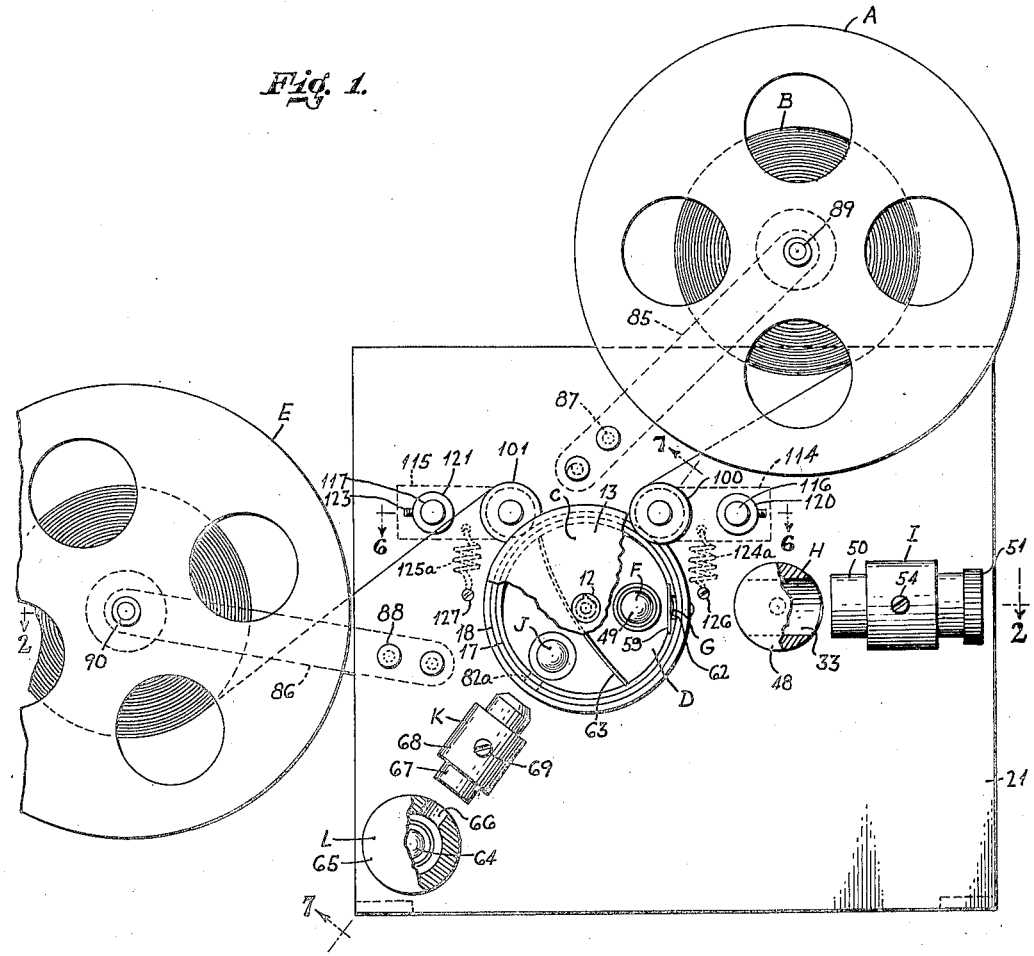
INVENTOR.
MYRON H. PRESS
BY Richards Geier
ATTORNEYS March 17, 1942.  M. H. PRESS  2,276,871
FILM FEEDING MECHANISM
Filed Aug. 15, 1939  3 Sheets-Sheet 2
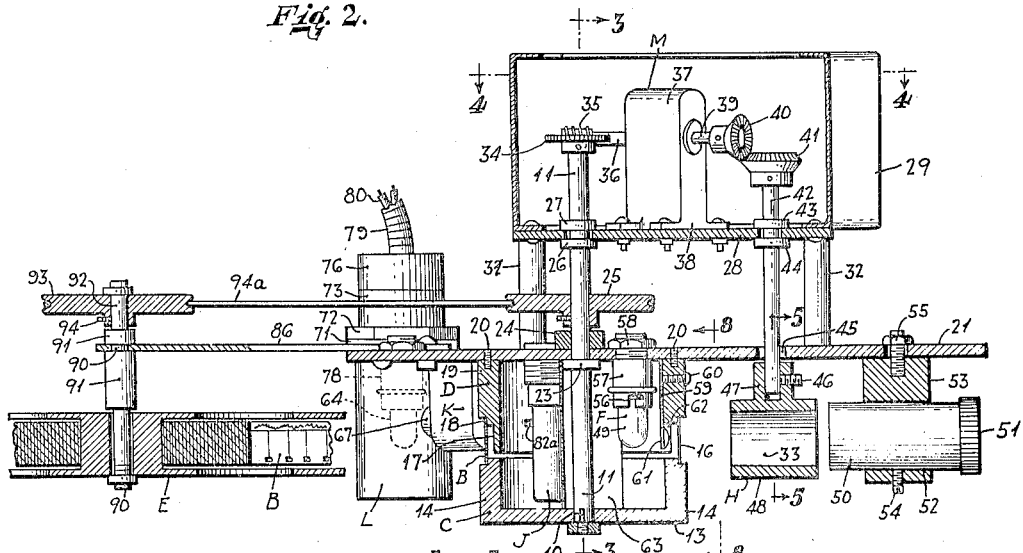
INVENTOR.
MYRON H. PRESS
BY
ATTORNEYS March 17, 1942.                M. H. PRESS                2,276,871
                         FILM FEEDING MECHANISM
                         Filed Aug. 15, 1939            3 Sheets-Sheet 3

INVENTOR.
MYRON H. PRESS
BY
Richards & Geier
ATTORNEYS

Patented Mar. 17, 1942

2,276,871

UNITED STATES PATENT OFFICE 2,276,871

FILM FEEDING MECHANISM

Myron H. Press, Woodside, N. Y.

Application August 15, 1939, Serial No. 290,204

6 Claims. (Cl. 88—16.2)

The present invention relates to a film feeding mechanism and particularly relates to an apparatus which may be utilized in connection with the projection of motion picture film.

Although the present invention will be particularly described in connection with this application to the projection of motion picture film, it is to be understood it has a broader application to the feeding of film whether for projection or other purposes in many types of apparatus.

The usual type of motion picture projection apparatus provides sprocket wheels both at the feed and take-off side of the film which control the feed of the film past the point of light projection, or through the path of the light beam.

At the point of passage across the light beam, the film is engaged by a reciprocating finger or lug fitting into the perforations therein driven by a Geneva movement, this engagement resulting in the film being rapidly advanced frame by frame for each operation of the finger.

These sprocket and finger mechanisms not only increase the expense and complication of the machinery and require the film to be perforated, but they also frequently result in the apparatus getting out of order and in the film being frequently injured due to pulling or tearing of the perforations therein.

Further, these devices require that an excess of film be utilized at both ends of the motion picture strip to accommodate an excessive length of slack or loop which must be employed to insure steady and satisfactory feeding of the film.

Moreover, with the sprocket type feeds of the character above described, there is a frequent tendency for the film to stretch between the sound-beam and sprocket drive which results in stretching the perforation causing injury to the film.

It is, therefore, among the objects of the present invention to provide an improved projection apparatus which although it be devoid of any sprockets or means to effect a step by step movement of the film past a point of projection or across a beam of light, will, nevertheless, assure most satisfactory projection of the motion picture film and synchronization with the sound by relatively inexpensive reliable apparatus.

In accomplishing the above object, it has been found most satisfactory, according to one embodiment of the present invention to provide a carrier drum for the film which will be rotatable and which will cause the film to move across a window or windows in a fixed drum mounted upon the same axis as the carrier drum.

Preferably, the film rides on a ledge on the carrier drum which is in contact with pressure and feed rollers. The film at the same time projects substantially the major portion of its width over a fixed drum within which fixed drum may be positioned suitable exciter or photoelectric cells for the sound projection and suitable sources of light or lamps for the motion picture projection.

In the preferred form of the invention, the condensing lens is positioned inside of the fixed drum and the projection lens is positioned substantially outside of the fixed drum and positioned therebetween is a revolving barrel shutter having a passage or aperture for the beam of light.

Referring to the drawings which illustrate several of the various possible embodiments of the present invention, but to which the present invention is by no means restricted since the drawings are merely by way of illustration and not by way of limitation.

Figure 1 is a side view of the complete apparatus in elevation, with the take-up reel and other parts partly broken away;

Figure 2 is a transverse sectional view on the line 2—2 of Figure 1;

Figure 3 is a transverse sectional view on the line 3—3 of Figure 2;

Figure 4 is a side sectional view on the line 4—4 of Figure 2;

Figure 5 is a detailed sectional view of the revolving barrel shutter construction on the line 5—5 of Figure 2;

Figure 6 is a detailed transverse sectional view on the line 6—6 of Figure 1;

Figure 6a is a detailed view of a part of the device shown in Figure 6 upon the line 6a—6a of Figure 6;

Figure 7 is a transverse sectional view on the line 7—7 of Figure 1;

Figure 8 is a transverse sectional view upon the line 8—8 of Figure 2; and

Figure 9 is a diagrammatic view similar to Figure 1, showing the operation of the device.

Referring to Figure 9, the feed reel A carries the film B which is carried on the rotating drum C over the fixed drum D (see Figure 8) then to the take-up reel E.

The fixed drum D (see Figure 1) is provided with a lamp F with a condensing lens G which projects light through a rotating barrel shutter H into the projection lens I.

The fixed drum D also receives the photoelectric cell J opposite, which cooperates with the optical system K and the exciter lamp L.

The motor mechanism M (Figure 2) drives the rotating shell C and the reels A and E in synchronism with the revolving barrel H. As best shown in Figures 2 and 3, the rotating shell is keyed at 10 to a shaft 11 and is held on said shaft by the nut 12.

The perpendicular wall 13 of the drum C is provided with an inwardly extending flange 14 which is shouldered at 15 to receive and carry the strip 16 forming part of the film B.

The film strip 16, as shown best in Figure 3, projects over the shoulder portions 17 and 18 in the side wall 19 of the fixed drum or stationary shell B which is fixed in position by the screws 20.

The screws 20 (see Figure 3) are mounted upon the main support plate 21 which carries the mechanism and which may form part of the projector or other machine frame.

The shaft 11 has a bearing at 22 in the plate 21, and is fixed in position by the collars 23 and 24.

The shaft carries the pulley 25 and also is provided with the collars 26 and 27 which fit on either side of the bracket 28 at the side of the motor and gear box 29.

The motor and gear arrangement M is provided with a series of support sleeves 31 and 32 which space it and support it from the plate 21.

The end of the shaft 11 carries the spur gear 34 which meshes with the worm 35 (see particularly Figure 2) and which worm 35 is carried on the shaft 36 of the motor 37.

The motor 37 is mounted by the feet 38 upon the plate 28.

The shaft 36 projects on the other side of the motor at 39 and carries a miter or bevel gear 40 which meshes with the miter or bevel gear 41 on the shaft 42.

The shaft 42 is provided with the collars 43 and 44 which fixes the position in respect to the plate 28. The end of the shaft 42 projects through the opening 45 in the wall 21 and is fixed by the set screw 46 to the neck 47 of the revolving barrel shutter 48.

The revolving barrel shutter 48 (see Figure 2) is positioned so that its axis of rotation will be parallel with the axis of the shaft 11 and so that it will be directly between the lamp 49 and the projection lens barrel 50.

The projection lens barrel 50, as indicated, includes a projection lens 51 (see Figure 9) and it is adjustably positioned in the opening 52 in the projection lens holder 53 by the set screw 54.

The projection lens holder 53 is held on the plate 21 by the nut and bolt 55.

The lamp 49 may have a detachable connection 56 to the base 57 which is mounted by the nut 58 on the plate 21 (see Figure 2).

Inside of the drum D is positioned the plate 59 by the screw 60 which carries the condensing lens 61 inside of the window 62.

The interior of the drum D is divided into two compartments by the shield or plate 63 (see Figures 1 and 9) one compartment receiving the lamp F and the other compartment receiving the photoelectric cell J.

The photoelectric cell arrangement is best shown in Figure 7 and mounted on the wall 21 is the exciter lamp 64 held in a casing or housing 65 which is provided with a window 66.

The exciter lamp 64 sends a beam of light to the tube 67 which is adjustably located in the sleeve 68 by the adjusting screw 69. The support 68 is mounted upon the plate 21 by the bolts or screws 70.

The housing 65 is also mounted on the wall 21 by the washer 71, and the nut 72 which fit upon the reduced diameter portion 73 of said housing 65. The portion 73 of said housing 65 projects through the opening 74 in the wall 21 and is stopped against said wall 21 by the shoulder 75.

The end of the extension 73 of the housing 65 receives an insert 76 which has a socket 77 for the bottom of the exciter lamp 78 and which is provided with a flexible tube 79 containing electrical conduits 80 leading to the transformer in the amplifier.

The photoelectric cell J inside of the drum D is provided with a photo-sensitive element 81 which transmits electrons to the element 82 and the base of the lamp is threaded at 83 into the wall 21 and is provided with electrical conduits 84.

The reels A and E are supported on the brackets 85 and 86 which are screwed at 87 and 88 to the plate 21. The end of the brackets carry the pivots 89 and 90 for the reels A and E.

As shown at the left of Figure 2, the pivot 90 is provided with enlarged portions 91, on both sides of the bracket 86 and with a reduced extension 92 which carries the pulley 93 by the set screw 94.

The pulley 93 is driven by the belt 94a which fits over the pulley 25 carried on the main shaft 11.

The film is held tightly on the rotating drum C by the rollers 100 and 101 which, as shown best in Figures 6 and 6a, are provided with the ridges or shoulders 102 and 103 which contact the shoulder 15 on the rotatable drum C.

These rollers are mounted by the pins 104 and 105 on the shafts 106 and 107 which pass through the slots 108 and 109 in the plate 21.

The ends of the shafts 106 and 107 have reduced portions 110 and 111 which are connected by the nuts 112 and 113 to the arms 114 and 115, which at their other ends are connected to the shafts 116 and 117.

The threaded bushings 118 and 119 fit around the shafts 116 and 117 and their end portions are fixed by the nuts 120 and 121 and the set screws 122 and 123.

The nuts 124 and 125 fix the studs 116 and 117 on the links 114 and 115. As shown, each of the links is provided with a spring 124a and 125a connected to screws 126 and 127 mounted on plate 21 to draw the links 114 and 115 down and the rollers 100 and 101 against the edge of the film resting against the edge of the shoulder 15.

In operation the film B will be fed from the reel A past the roller 100 onto the rotatable drum C and then past the roller 101 onto the take-up reel E.

The film will move continuously and the rollers 100 and 101 will always be drawn tightly against the shoulder 15 by the springs 124 and 125.

As the film B feeds, it will pass continuously across the windows 62 and 62a where it will intercept the beams of light, one extending from the lamp 49 through the condensing lens 61 and the projection lens 50 and the other from the exciter lamp L through the projection tube 67 to the photoelectric cell J.

The barrel shutter H will be so synchronized that the passage 33 therethrough will only permit passage of the beam of light from the condensing lens G to the projections lens I when the frame is exactly positioned across the window 62.

The sound, on the other hand, will be projected continuously as a beam of light passes through the sound track 120 of the film strip 16.

For each frame 121 as best shown in Figure 8, the barrel shutter 108 will move through 180° and to adjust the apparatus before initiation of operation, the frames are preferably positioned between the marked points or arrows 122 and 123.

It is apparent the specific illustrations shown above have been given by way of illustration and not by way of limitation and that the structures above described are subject to wide variation and modification without departing from the scope or intent of the invention, all of which variations and modifications are to be included within the scope of the present invention.

I claim:

1. A film feeding and projection device comprising a feed reel, a take up reel, rotating and fixed drums having a common axis, said drums being positioned side by side, said fixed drum being hollow and including a source of light and a window and means on said rotating drum carrying said film across said window, said window having a condensing lens and a projection lens aligned with said window and means to cut off passage of light at intervals between said condensing and projection lens.

2. A film feeding and projection device comprising a feed reel, a take up reel, rotating and fixed drums having a common axis, said drums being positioned side by side, said fixed drum being hollow and including a source of light and a window and means on said rotating drum carrying said film across said window, said window having a condensing lens and a projection lens aligned with said window and means to cut off passage of light at intervals between said condensing and projection lens, said last mentioned means including a rotating shutter.

3. A film feeding and projection device comprising a feed reel, a take up reel, rotating and fixed drums having a common axis, said drums being positioned side by side, said fixed drum being hollow and including a source of light and a window and means on said rotating drum carrying said film across said window, said window having a condensing lens and a projection lens aligned with said window and means to cut off passage of light at intervals between said condensing and projection lens, said last mentioned means including a rotating shutter, said shutter consisting of rotating cylinder the axis of rotation which is parallel to the axis of said drums and between said lens and said drums.

4. A film feeding and projection device comprising a feed reel, a take up reel, rotating and fixed drums having a common axis, said drums being positioned side by side, said fixed drum being hollow and including a source of light and a window and means on said rotating drum carrying said film across said window, each of said drums having adjacent shouldered portions between which said film is carried, the rotatable drum being provided with spring pressed rollers against said shouldered portion.

5. A film feeding and projection device comprising a feed reel, a take up reel, rotating and fixed drums having a common axis, said drums being positioned side by side, said fixed drum being hollow and the open end of said fixed drum being closed by the rotating drum said fixed drum being provided with two windows and means on said rotatable drum carrying the film across said windows, said windows being respectively provided with light and sound projection devices.

6. A film feeding and projection device comprising a feed reel, a take up reel, rotating and fixed drums having a common axis, said drums being positioned side by side, said fixed drum being hollow and the open end of said fixed drum being closed by the rotating drum said fixed drum being provided with two windows and means on said rotatable drum carrying the film across said windows, said hollow drum being divided into two compartments, one compartment carrying a photo-electric cell for sound projection and the other a source of light for picture projection.

MYRON H. PRESS.